US011434558B2

(12) United States Patent
He et al.

(10) Patent No.: US 11,434,558 B2
(45) Date of Patent: Sep. 6, 2022

(54) NPR NON-MAGNETIC STEEL MATERIAL FOR ROCK BOLT AND PRODUCTION METHOD THEREOF

(71) Applicants: Manchao He, Beijing (CN); Min Xia, Beijing (CN)

(72) Inventors: Manchao He, Beijing (CN); Min Xia, Beijing (CN); Hongyan Guo, Beijing (CN); Jiuping Wang, Dongtai (CN)

(73) Assignees: Manchao He, Beijing (CN); Min Xia, Beijing (CN)

( * ) Notice: Subject to any disclaimer, the term of this patent is extended or adjusted under 35 U.S.C. 154(b) by 0 days.

(21) Appl. No.: 15/733,046

(22) PCT Filed: May 23, 2018

(86) PCT No.: PCT/CN2018/088059
§ 371 (c)(1),
(2) Date: Apr. 29, 2020

(87) PCT Pub. No.: WO2019/222943
PCT Pub. Date: Nov. 28, 2019

(65) Prior Publication Data
US 2021/0189536 A1 Jun. 24, 2021

(51) Int. Cl.
*C22C 38/58* (2006.01)
*B21B 3/00* (2006.01)
(Continued)

(52) U.S. Cl.
CPC .............. *C22C 38/58* (2013.01); *B21B 3/003* (2013.01); *C22C 33/04* (2013.01); *C22C 38/002* (2013.01); *C22C 38/02* (2013.01); *C22C 38/42* (2013.01)

(58) Field of Classification Search
CPC ......... B21B 3/003; B22D 7/00; C21C 5/5264; C21C 1/02; C21D 8/065; C21D 9/0093; C21D 9/525; E02D 5/80
(Continued)

(56) References Cited

U.S. PATENT DOCUMENTS

2012/0156085 A1 6/2012 Thompson et al.

FOREIGN PATENT DOCUMENTS

| CN | 1418977 A | 5/2003 |
| CN | 101858225 A | 10/2010 |

(Continued)

OTHER PUBLICATIONS

NPL: online English translation of WO03025240A1, Mar. 2003 (Year: 2003).*
(Continued)

*Primary Examiner* — Jie Yang
(74) *Attorney, Agent, or Firm* — LKGlobal | Lorenz & Kopf, LLP

(57) ABSTRACT

An NPR non-magnetic steel material for rock bolt and a production method thereof are disclosed. The NPR non-magnetic steel material for rock bolt has a composition, in weight percent, consisting of: C: 0.4-0.7%, MN: 15-20%, Cr: 1-18%, Si: 0.3-3%, Ca: 0.05-0.15%, Cu: ≤0.03%, Ni: ≤0.02%, S: ≤0.001%, P: ≤0.001%, and the rest being Fe and unavoidable impurity elements. The NPR non-magnetic steel material for rock bolt and the production method thereof effectively solve the problems of steel materials for rock bolt in the prior art such as strong magnetism, low tensile strength and low effective elongation. The NPR non-magnetic steel material for rock bolt has a fully-austenitized structure and is non-magnetic, its yield strength is adjustable in the range of 600-1000 MPa, and its elongation is adjustable in the range of 20-60%.

4 Claims, 5 Drawing Sheets

(51) Int. Cl.
  *C22C 33/04* (2006.01)
  *C22C 38/00* (2006.01)
  *C22C 38/02* (2006.01)
  *C22C 38/42* (2006.01)
(58) Field of Classification Search
  USPC .......................................................... 420/58
  See application file for complete search history.

(56) References Cited

FOREIGN PATENT DOCUMENTS

| | | |
|---|---|---|
| CN | 104404390 A | 3/2015 |
| CN | 104451443 A | 3/2015 |
| CN | 105200315 A | 12/2015 |
| CN | 108754305 A | 11/2018 |
| EP | 0006085 A1 | 12/1979 |
| EP | 2935784 A2 | 10/2015 |
| JP | S58197256 A | 11/1983 |
| JP | S5928561 A | 2/1984 |
| JP | 04259325 A * | 9/1992 |
| JP | H09291341 A | 11/1997 |
| JP | 2000160233 A | 6/2000 |
| JP | 2009007596 A | 1/2009 |
| JP | 2011006776 A | 1/2011 |
| JP | 2016191124 A | 11/2016 |
| KR | 20160078825 A | 7/2016 |
| WO | WO-03025240 A1 * 3/2003 ............ B21C 37/08 |
| WO | 2007075096 A1 | 7/2007 |

OTHER PUBLICATIONS

NPL: on-line English translation of JP04259325A, Sep. 1992 (Year: 1992).*
NPL: Shao et al: Study on the mechanical properties of NPR steel bars and the bonding properties with marine concrete, Construction and Building Material 316 (2022) 125721 (Year: 2022).*

* cited by examiner

NPR NON-MAGNETIC STEEL MATERIAL FOR ROCK BOLT AND PRODUCTION METHOD THEREOF

CROSS-REFERENCE TO RELATED APPLICATION

This Application is a U.S. National-Stage entry under 35 U.S.C. § 371 based on International Application No. PCT/CN2018/088059, filed May 23, 2018 which was published under PCT Article 21(2) which is incorporated herein by reference in its entirety.

TECHNICAL FIELD

This Application pertains to the technical field of materials for mining equipment, and in particular, to an NPR non-magnetic steel material for rock bolt and a production method thereof.

BACKGROUND

With the continuous development of underground engineering, some special supports for underground construction make harsh demands on the magnetism of rock bolts. As the energy demand in the economic development continues to rise and the extent of mining becomes increasingly higher, shallow resources have become depleted day by day, and domestic and foreign mines have successively entered the phase of deep mining. At present, the mining depth of many metal mines in the world has exceeded 1000 m. Most metal mines in Switzerland, Canada, Australia, South Africa and other countries have mining depths of more than 1000 m, and some even exceed 3000 m. In China, some metal and non-ferrous metal mines have mining depths in the range of 800-1000 m. It is estimated that in the next 20 years, the mining depth of many coal mines in China will reach 1000-2000 m. In deep mining, affected by complex geological conditions such as high geostress, high geotemperature, high karst water pressure, and mining disturbance (i.e., so-called "three-high and one-disturbance"), most rock masses for engineering purposes exhibit a large deformation mechanical state of soft rock. After engineering excavation, the roadway-surrounding rock shows the characteristics of large deformation and failure, specifically, such as large deformation of soft rock, large deformation of rock burst, large deformation of gas outburst. At present, support methods based on traditional materials such as traditional rock bolts, anchor cables, U-shaped steel retractable supports are widely used in coal seam roadways of worldwide mines. According to statistics, coal mine roadways in China are growing at a speed of 8000 km per year, of which about 80% are supported by rock bolts, so hundreds of millions of rock bolts are used each year to support the roadway-surrounding rock. However, these rock bolts are made of conventional Poisson's ratio materials (i.e., plastic hardening materials) with small deformation and low strength, low elongation and low retraction, which are no longer suitable for the nonlinear large-scale deformation and failure characteristics of surrounding rock in deep roadways. Under the action of impact loads, the rock bolt may reach its yield strength instantaneously and fracture and failure occur, and its bearing and protection capabilities are lost, which leads to undesirable situations such as that the roadway must be repeatedly repaired, the steel frame is distorted, and the poured concrete cracks. Therefore, the continuous increase of mining depth has also brought severe challenges to the research of deep roadway support materials, which has become a hot spot in the field of geotechnical mechanics and underground engineering in the world. Conventional rock bolts can be divided into three categories: two-point anchored rock bolts (such as expansion shell rock bolts), fully-grouted rock bolts (such as rebar, which has high support resistance but small deformation and cannot adapt to large deformation of the roadway-surrounding rock due to tensile failure), and friction rock bolts (which adapt to the elastoplastic deformation of the surrounding rock through the friction between the bolt body and the hole wall, but its bearing capacity is small and cannot provide sufficient support resistance). Therefore, an ideal roadway support system should not only have sufficient strength, but also have a large amount of deformation in order to adapt to the nonlinear large-scale deformation and failure characteristics of the surrounding rock in deep roadways. In the last two decades, in order to control large deformation and failure of the roadway-surrounding rock, worldwide researches have been focused on energy absorption rock bolts. Currently energy-absorbing rock bolts mainly include: cone bolts, Garford bolts, Roffex bolts (with a constant resistance of 80-90 kN and a maximum deformation of 300 mm), MCB conebolts (with a maximum extension up to 180 mm), D-type bolts (with a constant resistance of 100-210 kN and a deformation of 110-167 mm), etc. However, these energy-absorbing rock bolts mainly achieve their support performance by changing the material of the bolt body or through the friction structure, and cannot provide high constant resistance and large amount of deformation at the same time, so it is still impossible for them to control engineering disasters such as large deformation of soft rock and large deformation of rock burst in deep roadways in actual engineering applications.

At present, most rock bolts are made of martensite and ferrite with a body-centered cubic structure in order to maintain high strength. Since body-centered cubic structure crystals often have strong magnetism, almost all of the current rock bolts have the problem of strong magnetism. On the other hand, the austenitic stainless steel generally has a unitary austenite structure at room temperature, which has a face-centered cubic structure and is non-magnetic.

In sum, rock bolts in the prior art have strong magnetism, low tensile strength and low effective elongation due to the problems of steel materials for rock bolts. Therefore, when used as the roadway support, rock bolts in the prior art cannot meet the requirements of large deformation of surrounding rock, and may break during use. In addition, other objects, desirable features and characteristics will become apparent from the subsequent summary and detailed description, and the appended claims, taken in conjunction with the accompanying drawings and this background.

SUMMARY

An embodiment of the present disclosure provides an NPR non-magnetic steel material for rock bolt and a production method thereof to solve the problem that rock bolt in the prior art have strong magnetism, low tensile strength and low effective elongation.

In order to solve the above technical problem, according to one aspect of the present disclosure, an NPR non-magnetic steel material for rock bolt is provided. The NPR non-magnetic steel material for rock bolt has a composition, in weight percent, consisting of: C: 0.4-0.7%, Mn: 15-20%, Cr: 1-18%, Si: 0.3-3%, Ca: 0.05-0.15%, Cu: ≤0.03%, Ni:

≤0.02%, S: ≤0.001%, P: ≤0.001%, and the rest being Fe and unavoidable impurity elements.

Further, the NPR non-magnetic steel material for rock bolt in a hot rolled state has a yield strength of 600-1000 MPa, a tensile strength of 900-1100 MPa, a uniform elongation of 20-50%, and the NPR non-magnetic steel material for rock bolt has a Poisson's ratio of 0.003-0.008.

According to another aspect of the present disclosure, a production method of an NPR non-magnetic steel material for rock bolt is provided. The NPR non-magnetic steel material for rock bolt is a hot rolled round steel bar or in a cold rolled state, the NPR non-magnetic steel material for rock bolt in a hot rolled state has a yield strength of 600-1000 MPa, a tensile strength of 900-1100 MPa, a uniform elongation of ≥20-50%, and the NPR non-magnetic steel material for rock bolt has a Poisson's ratio of 0.003-0.008;

the NPR non-magnetic steel material for rock bolt has a composition, in weight percent, consisting of: C: 0.4-0.7%, Mn: 15-20%, Cr: 1-18%, Si: 0.3-3%, Ca: 0.05-0.15%, Cu: 0.03%, Ni: 0.02%, S: 0.001%, P: 0.001%, and the rest being Fe and unavoidable impurity elements; the production method comprises the following steps:

a step of intermediate frequency smelting: adding alloy elements according to the composition of the NPR non-magnetic steel material for rock bolt, smelting by an intermediate frequency steel smelting process, and adding active lime and fluorite during the smelting process to adjust slagging, then performing on-line composition analysis and supplementing alloy elements to adjust ratios of molten steel to design values, and performing deoxidation, desulfurization and dephosphorization;

a step of refining: suspending the molten steel smelted in an intermediate frequency furnace into a refining furnace, and performing refining and slagging by blowing argon from the bottom of the refining furnace with an argon gas amount of 3-60 L/min, adding calcium fluoride, lime and deslagging agent into the refining furnace to further deoxidize, desulfurize and dephosphorize, then performing on-line composition analysis to finely adjust a chemical composition of the molten steel;

a step of continuous mold casting: controlling a tapping temperature of the molten steel after refined in the refining furnace to 1560-1590° C., introducing the molten steel after refined into a tundish, performing mold casting with a pre-warmed temperature of a steel mold being controlled to 200-250° C., and demolding after natural cooling;

a step of heating in a heating furnace: putting cooled ingot after mold cast into a heating furnace and holding for 2-4 hours at a furnace temperature of 1200° C.;

a step of continuous hot rolling: subjecting the billet to hot rolling, in which a rolling start temperature is controlled to 1050° C. ±50° C., a rolling end temperature is controlled to 850° C. ±50° C., a rolling speed is controlled to 8-10 m/s, and the billet is naturally cooled to room temperature after hot rolled; and a step of continuous cold rolling: subjecting hot-rolled round steel bar to continuous cold rolling, holding for 1 hour at a temperature according to requirements of different yield strength and elongation, and naturally cooling outside a furnace.

Further, after the step of continuous mold casting and before the step of heating in a heating furnace, the production method further comprises: a step of billet inspection: detecting surface defects according to a surface inspection method of billet.

Further, the refining furnace is an LF refining furnace.

By using the technical solutions of the present disclosure, compared with conventional steel materials for rock bolt in the prior art, the NPR non-magnetic steel material for rock bolt of the present disclosure is technically advantageous in that it has a fully austenitized structure and is non-magnetic, and it has a yield strength of 600-1000 MPa, a tensile strength of 900-1100 MPa, a uniform elongation of 20-50%, and a Poisson's ratio of 0.003-0.008.

BRIEF DESCRIPTION OF DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The present disclosure will be described in further detail below with reference to the drawings and specific embodiments, but they are not intended to limit the present disclosure.

According to an embodiment of the present disclosure, an NPR non-magnetic steel material for rock bolt is provided. NPR refers to a negative Poisson's ratio material. The NPR non-magnetic steel material for rock bolt has a composition, in weight percent, consisting of: C: 0.4-0.7%, Mn: 15-20%, Cr: 1-18%, Si: 0.3-3%, Ca: 0.05-0.15%, Cu: ≤0.03%, Ni: ≤0.02%, S: ≤0.001%, P: ≤0.001%, and the rest being Fe and unavoidable impurity elements.

C: Carbon is the most effective element to improve the strength of steel, and 0.4-0.7% is selected to keep its plasticity and toughness to the original level and ensure the impact property.

Mn: The main effect of manganese is to dissolve in ferrite to improve the strength of material. It is also a good deoxidizer and desulfurizer. By containing a certain amount of manganese, the brittleness caused by sulfur can be eliminated or weaken, thereby improving the workability of steel.

Cr: Chromium can increase the strength and hardness in the rolled state of the carbon steel, reduce the elongation and contraction of area. The strength of steel can be improved by containing a certain amount of chromium.

Ca: A certain amount of calcium can refine the grains, partially desulfurize, change the composition, quantity and morphology of non-metallic inclusions, improve the fluidity of molten steel, and improve the hardness and creep rupture strength of steel.

Si: Silicon does not form carbides in steel, but exists in the form of solid solution in ferrite or austenite, and thus significantly improves the elastic limit, yield strength and yield ratio of steel. So the Si content is low, and the range of Si is selected to be 0.01%.

Cu: The addition of trace copper can increase the strength and yield ratio of steel.

Ni: Nickel can improve the strength, toughness, and hardenability of steel. The strength and toughness can be improved by containing a certain amount of nickel.

P, S: Phosphorus and sulfur are harmful elements, so it is better if their contents are lower. If the content of sulfur is too high, a large amount of MnS inclusions will be formed, thereby reducing the ductility and toughness of steel, so it is better if the sulfur content is lower, and the range of sulfur is selected to be 0.001%. Phosphorus is easy to segregate at the grain boundaries, thereby increasing the brittleness of the steel and greatly reducing the impact property, so it is better if the phosphorus content is lower, and the range of phosphorus is selected to be 0.001%.

Figure 1:
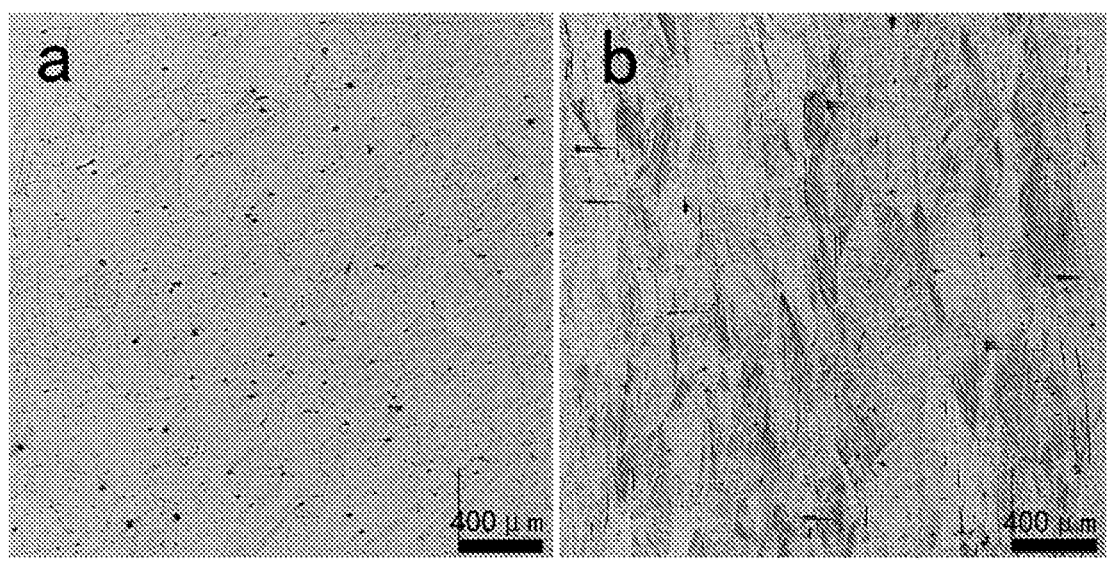
FIG. 1 is a schematic diagram of typical metallographic structures of an NPR non-magnetic steel material for rock bolt according to the present disclosure before and after plastic deformation.
Figure 2:
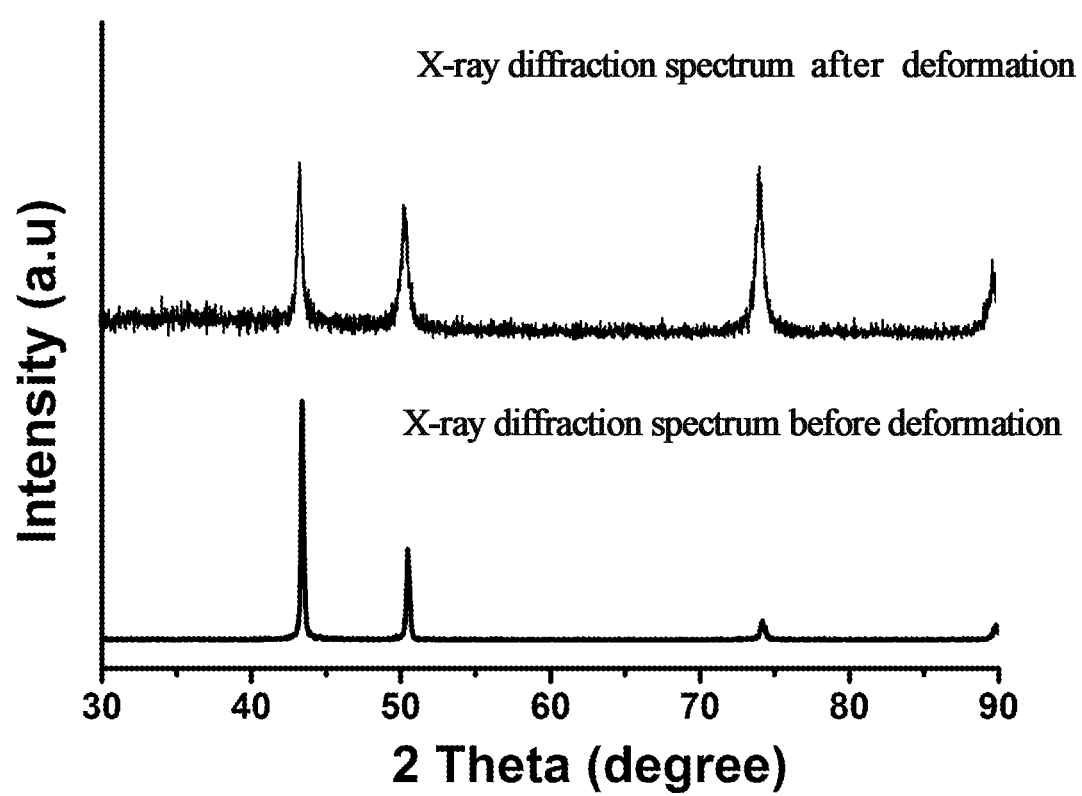
FIG. 2 is a schematic diagram of typical X-ray diffraction spectrum of an NPR non-magnetic steel material for rock bolt according to the present disclosure before and after deformation.

FIG. 1 shows the typical metallographic structures of the NPR non-magnetic steel before and after plastic deformation (a is before deformation and b is after deformation). It can be seen that the NPR non-magnetic steel has a stable austenitized structure before and after deformation. FIG. 2 is typical X-ray diffraction spectrum of the NPR non-magnetic steel before and after plastic deformation. It can be seen that NPR non-magnetic steel has a unitary austenite before and after deformation (the lower curve in FIG. 2 is before deformation and the upper curve in FIG. 2 is after deformation), which further indicates that the NPR steel has a stable non-magnetic austenitized structure. The non-magnetic steel has a unitary austenite before and after deformation, which further indicates that NPR steel has a stable non-magnetic austenitized structure, and can prove that the steel material for rock bolt according to the present disclosure is non-magnetic.

Figure 3:
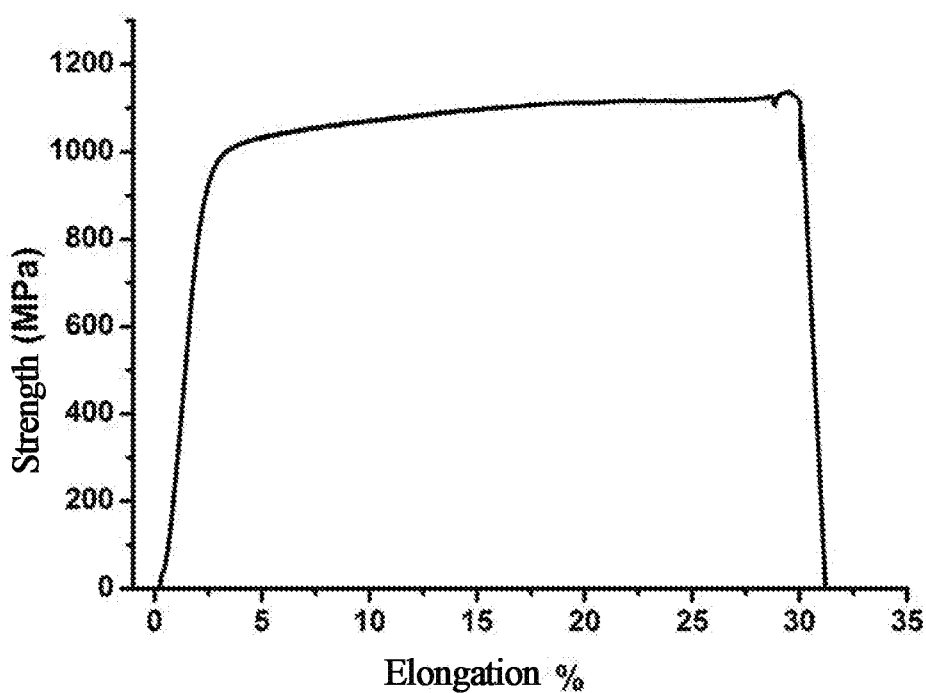
FIG. 3 is a schematic diagram of a tensile test curve of an NPR non-magnetic steel material for rock bolt subjected to round steel bar hot rolling + cold rolling +550° C. continuous annealing according to an embodiment of the present disclosure.

FIG. 3 shows a tensile test curve of the NPR non-magnetic steel material for rock bolt according to the present disclosure. It can be seen from the pulling force-displacement curve before and after pulling of the NPR non-magnetic steel material for rock bolt in FIG. 3 that, its yielding strength is 980 MPa, tensile strength is 1100 MPa, and uniform elongation is 30%. Thus, compared with conventional steel materials for rock bolt in the prior art, the NPR non-magnetic steel material for rock bolt of the present disclosure is technically advantageous in that the NPR non-magnetic steel material for rock bolt has a yield strength of up to 980 MPa, a tensile strength of up to 1100 MPa, as well as an elongation of 30% or more while maintaining the high strengths.

Figure 5:
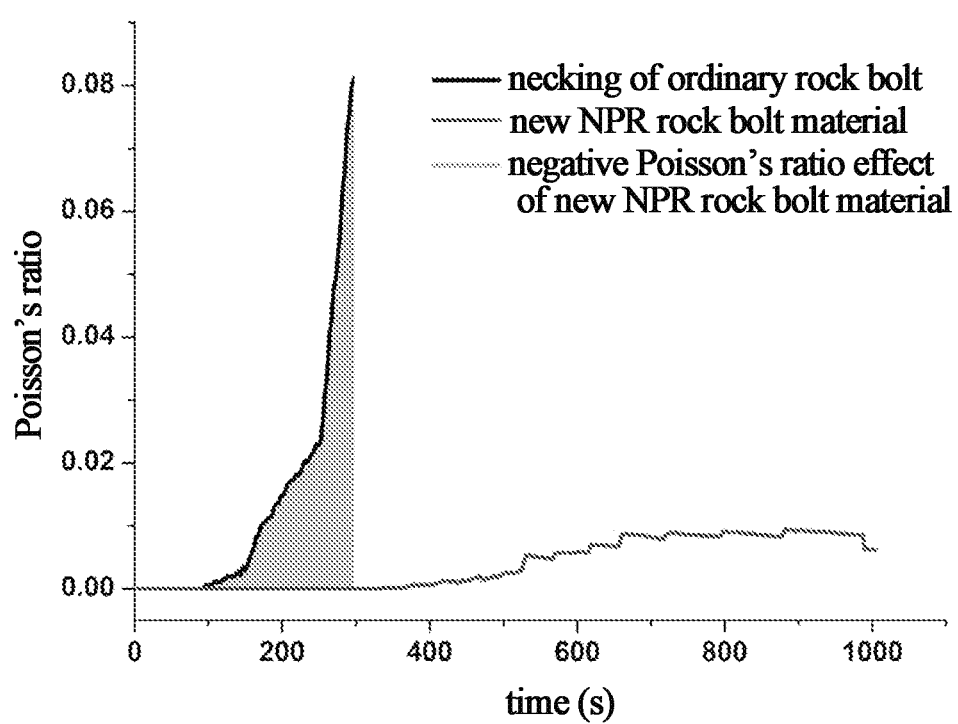
FIG. 5 is a schematic diagram of the negative Poisson's ratio effect of an NPR non-magnetic steel material for rock bolt according to an embodiment of the present invention.

In addition, the NPR non-magnetic steel material for rock bolt of the present disclosure not only has the above advantages, but also exhibits a significant negative Poisson's ratio effect. Referring to FIG. 5, the test values of the dynamic Poisson's ratio of an ordinary rock bolt and the NPR rock bolt material (i.e., the NPR non-magnetic steel material for rock bolt of the present disclosure) are shown, respectively. The shaded area in FIG. 5 is the negative Poisson's ratio effect zone of the NPR rock bolt material (i.e., the NPR non-magnetic steel material for rock bolt of the present disclosure); its Poisson's ratio is 0.003, which shows a significant negative Poisson's ratio effect compared with the Poisson's ratio of 0.03 of the ordinary rock bolt.

Figure 7:
FIG. 7 is a schematic diagram of a tensile test curve of an ordinary rock bolt in the prior art.

FIG. 7 is a schematic diagram of a tensile test curve of an ordinary rock bolt widely used currently, which has a yield strength of 520 MPa (200 KN), a tensile strength of 700 MPa (272 KN), an elongation of 15%, and is magnetic.

The NPR non-magnetic steel material for rock bolt of the present embodiment in a hot rolled state has a yield strength of 600-1000 MPa, a tensile strength of 900-1100 MPa, a uniform elongation of ≥20-50%, and the NPR non-magnetic steel material for rock bolt has a Poisson's ratio of 0.003-0.008.

Figure 6:
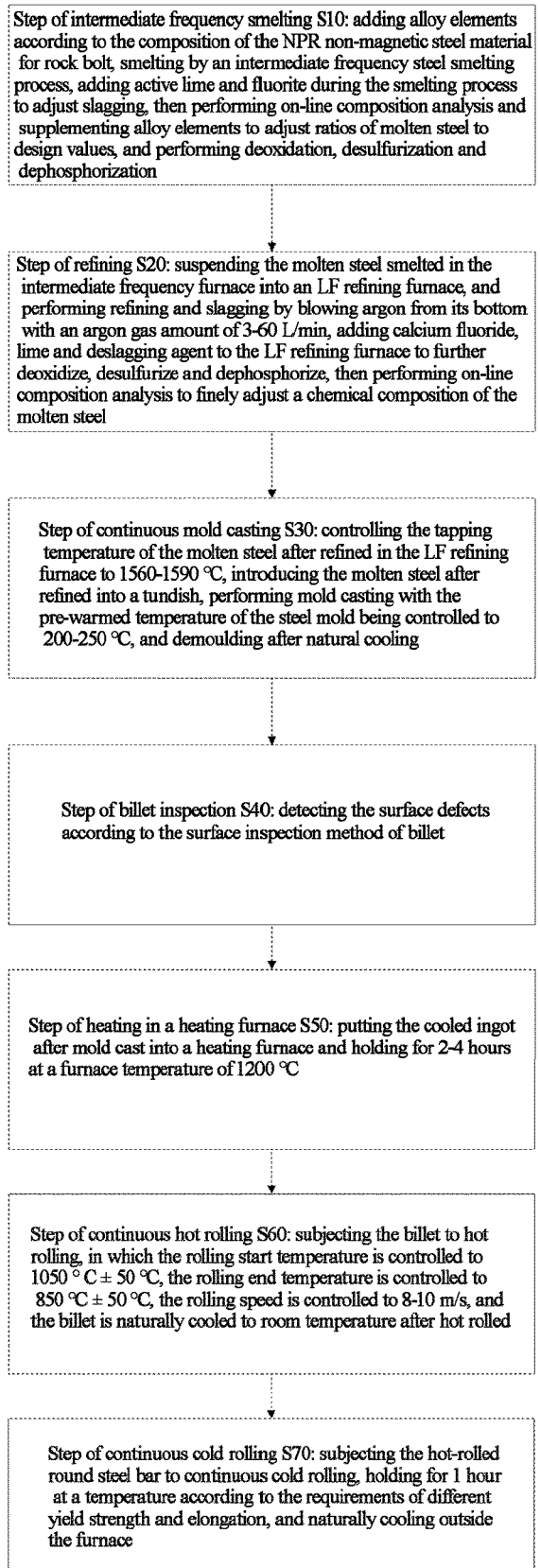
FIG. 6 is a schematic flowchart of a production method of an NPR non-magnetic steel material for rock bolt according to an embodiment of the present invention.

The present disclosure also provides an embodiment of a production method of a NPR non-magnetic steel material for rock bolt. Referring to FIG. 6, the NPR non-magnetic steel material for rock bolt is a hot rolled round steel bar, and the NPR non-magnetic steel material for rock bolt has a yield strength of 600-1000 MPa, a tensile strength of 900-1100 MPa and a uniform elongation of ≥20-50%. Comparing FIG. 6 with FIG. 7, it can be seen that the NPR non-magnetic steel material for rock bolt has characteristics such as higher yield strength, tensile strength, elongation, and non-magnetic characteristics, and its performance is much better than ordinary rock bolt materials. The NPR non-magnetic steel material for rock bolt has a composition, in weight percent, consisting of: C: 0.4-0.7%, Mn: 15-20%, Cr: 1-18%, Si: 0.3-3%, Ca: 0.05-0.15%, Cu: ≤0.03%, Ni: ≤0.02%, S: ≤0.001%, P: ≤0.001%, and the rest being Fe and unavoidable impurity elements.

The production method comprises the following steps:

Step of intermediate frequency smelting S10: adding alloy elements according to the composition of the NPR non-magnetic steel material for rock bolt, smelting by an intermediate frequency steel smelting process, adding active lime and fluorite during the smelting process to adjust slagging, then performing on-line composition analysis and supplementing alloy elements to adjust constitute ratios of molten steel as designed, and performing deoxidation, desulfurization and dephosphorization.

Step of refining S20: suspending the molten steel smelted in the intermediate frequency furnace into an LF refining furnace, and performing refining and slagging by blowing argon from the bottom of the refining furnace with an argon gas amount of 3-60 L/min, adding calcium fluoride, lime and deslagging agent to the LF refining furnace to further deoxidize, desulfurize and dephosphorize, then performing on-line composition analysis to finely adjust a chemical composition of the molten steel.

Step of continuous mold casting S30: controlling the tapping temperature of molten steel after refined in LF refining furnace to 1560-1590° C., introducing the molten steel after refined into a tundish, performing mold casting with the pre-warmed temperature of the steel mold controlled to 200-250° C., and demoulding after natural cooling.

Step of billet inspection S40: detecting the surface defects according to the surface inspection method of the billet.

Step of heating in a heating furnace S50: putting the cooled ingot after mold cast into a heating furnace and holding for 2-4 hours at a furnace temperature of 1200° C.

Step of continuous hot rolling S60: subjecting the billet to hot rolling, in which the rolling start temperature is controlled to 1050° C.±50° C., the rolling end temperature is controlled to 850° C.±50° C., the rolling speed is controlled to 8-10 m/s, and the billet is naturally cooled to room temperature after hot rolled.

Step of continuous cold rolling S70: subjecting the hot rolled round steel bar to continuous cold rolling, holding for 1 hour at a temperature according to the requirements of different yield strength and elongation, and naturally cooling outside the furnace.

Figure 4:
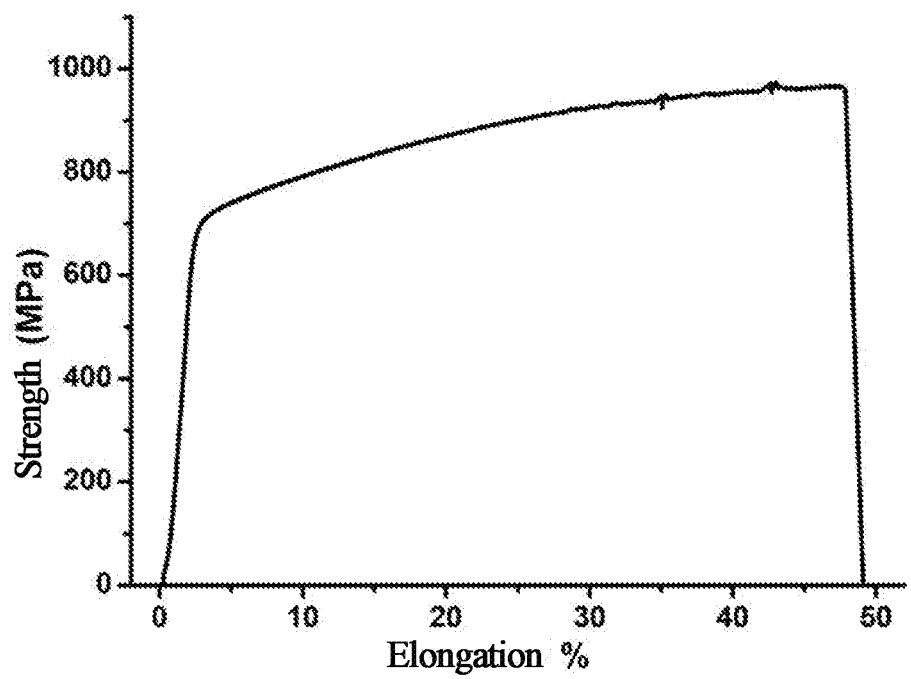
FIG. 4 is a schematic diagram of a tensile test curve of a hot rolled round steel bar of an NPR non-magnetic steel material for rock bolt according to an embodiment of the present disclosure.

According to the above production method of an NPR non-magnetic steel material for rock bolt, the smelting composition is simple, the control is stable, the production efficiency is high, and the production cost is low. It solved the problems of the rock bolt production method or process in the prior art that the production process is complicated, the production cost is high, and the production efficiency is low. Compared with conventional NPR non-magnetic steel materials for rock bolt in the prior art, the NPR non-magnetic steel material for rock bolt obtained according to the above production method is technically advantageous in that the NPR non-magnetic steel material for rock bolt has a typical non-magnetic austenite structure, and has a stable non-magnetic full-austenite structure before and after deformation, see FIGS. 1 and 2 for details; the NPR non-magnetic steel material for rock bolt has a yield strength of up to 980 MPa, a tensile strength of up to 1100 MPa as well as an elongation of 30% while maintaining the high strengths. Moreover, the NPR non-magnetic steel material for rock bolt of the present disclosure has the following advantages: the deformation amount can be controlled within 20% according to the requirements of different yield strength and elongation, its yield strength is adjustable in the range of 600-1000 MPa, and its elongation is adjustable in the range of 20-60%, see FIGS. 3 and 4 for details. FIG. 3 is a schematic diagram of the tensile test curve of an NPR non-magnetic steel material for rock bolt subjected to round steel bar hot rolling + cold rolling +550° C. continuous annealing. FIG. 4 is a schematic diagram of a tensile test curve of a hot rolled round steel bar of an NPR non-magnetic steel material for rock bolt according to an embodiment of the present disclosure.

It can be seen from FIGS. 3 and 4 that when the diameter and the annealing temperatures after cold rolling of the NPR non-magnetic steel material for rock bolt are different, the yield strength of the NPR non-magnetic steel material for rock bolt can still keep within the range of 600-1000 MPa, and the elongation of the NPR non-magnetic steel material for rock bolt can still keep within the range of 20-60%.

It should be noted that the terminology used herein is only for describing specific embodiments and is not intended to limit the exemplary embodiments according to the present disclosure. As used herein, the singular forms are intended to include the plural forms as well, unless the context clearly indicates otherwise. It should also be understood that when the terms "include" and/or "comprise" are used in this specification, they indicate there are features, steps, operations, devices, components, and/or combinations thereof.

It should be noted that the terms "first" and "second" in the specification, claims and drawings of the present disclosure are used to distinguish similar objects, and are not necessarily used to describe a specific order or sequence. It should be understood that the terms used in this way are interchangeable under appropriate circumstances so that the embodiments of the present disclosure described herein can be implemented in an order other than those illustrated or described herein.

Of course, the above are only preferable embodiments of the present disclosure. It should be noted that those skilled in the art can make improvements and modifications without departing from the basic principles of the present disclosure, and these improvements and modifications shall also fall within the protection scope of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A non-magnetic steel material with negative Poisson's ratio effect for rock bolt, wherein the non-magnetic steel material with negative Poisson's ratio effect for rock bolt has a composition, in weight percent, consisting of: C: 0.4-0.7%, Mn: 15-20%, Cr: 1-18%, Si: 0.3-3%, Ca: 0.05-0.15%, Cu: ≤0.03%, Ni: ≤0.02%, S: ≤0.001%, P: ≤0.001%, and the rest being Fe and unavoidable impurity elements wherein the non-magnetic steel material with negative Poisson's ratio effect for rock bolt in a hot rolled state has a yield strength of 600-1000 MPa, a tensile strength of 900-1100 MPa, a uniform elongation of ≥20-50%, and the non-magnetic steel material with negative Poisson's ratio effect for rock bolt has a Poisson's ratio of 0.003-0.008.

2. A production method of a non-magnetic steel material with negative Poisson's ratio effect for rock bolt, wherein the non-magnetic steel material with negative Poisson's ratio effect for rock bolt is a hot rolled round steel bar or in a cold rolled state, the non-magnetic steel material with negative Poisson's ratio effect for rock bolt in a hot rolled state has a yield strength of 600-1000 MPa, a tensile strength of 900-1100 MPa, a uniform elongation of ≥20-50%, and the non-magnetic steel material with negative Poisson's ratio effect for rock bolt has a Poisson's ratio of 0.003-0.008;

the non-magnetic steel material with negative Poisson's ratio effect for rock bolt has a composition, in weight percent, consisting of: C: 0.4-0.7%, Mn: 15-20%, Cr: 1-18%, Si: 0.3-3%, Ca: 0.05-0.15%, Cu: ≤0.03%, Ni: ≤0.02%, S: ≤0.001%, P: ≤0.001%, and the rest being Fe and unavoidable impurity elements;

the production method comprises the following steps:

a step of intermediate frequency smelting (S10): adding alloy elements according to the composition of the non-magnetic steel material with negative Poisson's ratio effect for rock bolt, smelting by an intermediate frequency steel smelting process, adding active lime and fluorite during the smelting process to adjust slagging, then performing on-line composition analysis and supplementing alloy elements to adjust ratios of molten steel to design values, and performing deoxidation, desulfurization and dephosphorization;

a step of refining (S20): suspending the molten steel smelted in an intermediate frequency furnace into a refining furnace, and performing refining and slagging by blowing argon from the bottom of the refining furnace with an argon gas amount of 3-60 L/min, adding calcium fluoride, lime and deslagging agent to the refining furnace to further deoxidize, desulfurize and dephosphorize, then performing on-line composition analysis to finely adjust a chemical composition of the molten steel;

a step of continuous mold casting (S30): controlling a tapping temperature of the molten steel after refined in the refining furnace to 1560-1590° C., introducing the molten steel after refined into a tundish, performing mold casting with a pre-warmed temperature of a steel mold being controlled to 200-250° C., and demoulding after natural cooling;

a step of heating in a heating furnace (S50): putting cooled ingot after mold cast into a heating furnace and holding for 2-4 hours at a furnace temperature of 1200° C.;

a step of continuous hot rolling (S60): subjecting the billet to hot rolling, in which a rolling start temperature is controlled to 1050° C.±50° C., a rolling end temperature is controlled to 850° C.±50° C., a rolling speed is controlled to 8-10 m/s, and the billet is naturally cooled to room temperature after hot rolled; and a step of continuous cold rolling (S70): subjecting hot-rolled round steel bar to continuous cold rolling, holding for 1 hour at a temperature according to requirements of different yield strength and elongation, and naturally cooling outside a furnace.

3. The production method according to claim 2, wherein after the step of continuous mold casting (S30) and before the step of heating in a heating furnace (S50), the production method further comprises:

a step of billet inspection (S40): detecting surface defects according to a surface inspection method of billet.

4. The production method according to claim 2, wherein the refining furnace is an LF refining furnace.

* * * * *